US010895683B1

(12) United States Patent
Kuwajima et al.

(10) Patent No.: US 10,895,683 B1
(45) Date of Patent: Jan. 19, 2021

(54) SEMICONDUCTOR DEVICE

(71) Applicant: RENESAS ELECTRONICS CORPORATION, Tokyo (JP)

(72) Inventors: Teruhiro Kuwajima, Tokyo (JP); Yasutaka Nakashiba, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/601,254

(22) Filed: Oct. 14, 2019

(51) Int. Cl.
*G02B 6/12* (2006.01)
*G02B 6/13* (2006.01)

(52) U.S. Cl.
CPC ........... *G02B 6/12004* (2013.01); *G02B 6/13* (2013.01); *G02B 2006/12142* (2013.01)

(58) Field of Classification Search
CPC .................. G02B 6/12004; G02B 6/13; G02B 2006/12142
See application file for complete search history.

(56) References Cited

U.S. PATENT DOCUMENTS 5,479,539 A * 12/1995 Goldsmith ......... G02B 6/12004 385/1
6,285,043 B1 * 9/2001 Yap ..................... G02B 6/4232 257/81
6,330,377 B1 * 12/2001 Kosemura ................ G02B 6/42 385/14
8,213,751 B1 * 7/2012 Ho .......................... G02B 6/43 385/1
2014/0204548 A1 * 7/2014 Sekine ................... H05K 1/162 361/761
2015/0076661 A1 * 3/2015 Musk ....................... G02B 6/12 257/615
2015/0285998 A1 * 10/2015 Babakhani ............. H01S 5/021 438/27
2016/0377806 A1 * 12/2016 Ellis-Monaghan .......................... G02B 6/12002 385/14
2019/0352213 A1 * 11/2019 Letz ...................... C03C 4/0092
2019/0391327 A1 * 12/2019 Watanuki ............... G02F 1/015

FOREIGN PATENT DOCUMENTS

JP 2000-040925 A 2/2000
KR 736641 B1 * 7/2007 ............... H05K 1/02

* cited by examiner

*Primary Examiner* — Daniel Petkovsek
(74) *Attorney, Agent, or Firm* — McDermott Will & Emery LLP

(57) ABSTRACT

A semiconductor device includes an insulating layer, an optical waveguide formed on the insulating layer, a multilayer wiring layer formed on the insulating layer such that the multilayer wiring layer covers the optical waveguide, and a first inductor formed in the multilayer wiring layer.

15 Claims, 18 Drawing Sheets

SEMICONDUCTOR DEVICE

BACKGROUND

It relates to a semiconductor device, for example, a semiconductor device including an optical waveguide and an inductor.

A semiconductor device including an inductor as a passive device is known. Japanese Unexamined Patent Application Publication No. 2000-040925 discloses a differential amplifier circuit as a circuit for amplifying an input signal. The differential amplifier circuit includes a first circuit block in which a first inductor, a first resistive element, and a first transistor are coupled between a power supply terminal and a ground terminal. The differential amplifier circuit further includes a second circuit block in which a second inductor, a second resistive element, and a second transistor are coupled between the power supply terminal and the ground terminal. The first circuit block is coupled in parallel with the second circuit block between the power supply terminal and the ground terminal.

SUMMARY

From a viewpoint of ensuring the desired characteristics, it is preferable that the inductor has a somewhat larger size. Therefore, even if a side of the transistor is reduced, the area occupied by the inductor in the semiconductor device may not be reduced. Thus, a conventional semiconductor device can be improved from a viewpoint of miniaturization of the semiconductor device.

A problem of embodiment is to downsize the semiconductor device. Other problems and novel features will become apparent from the description of the specification and drawings.

Means of Solving the Problems

The semiconductor device according to the embodiment includes an insulating layer, an optical waveguide formed on the insulating layer, a multilayer wiring layer formed on the insulating layer such that the multilayer wiring layer covers the optical waveguide, and a first inductor formed in the multilayer wiring layer.

According to embodiments, the semiconductor device can be miniaturized.

DETAILED DESCRIPTION

Figure 1:
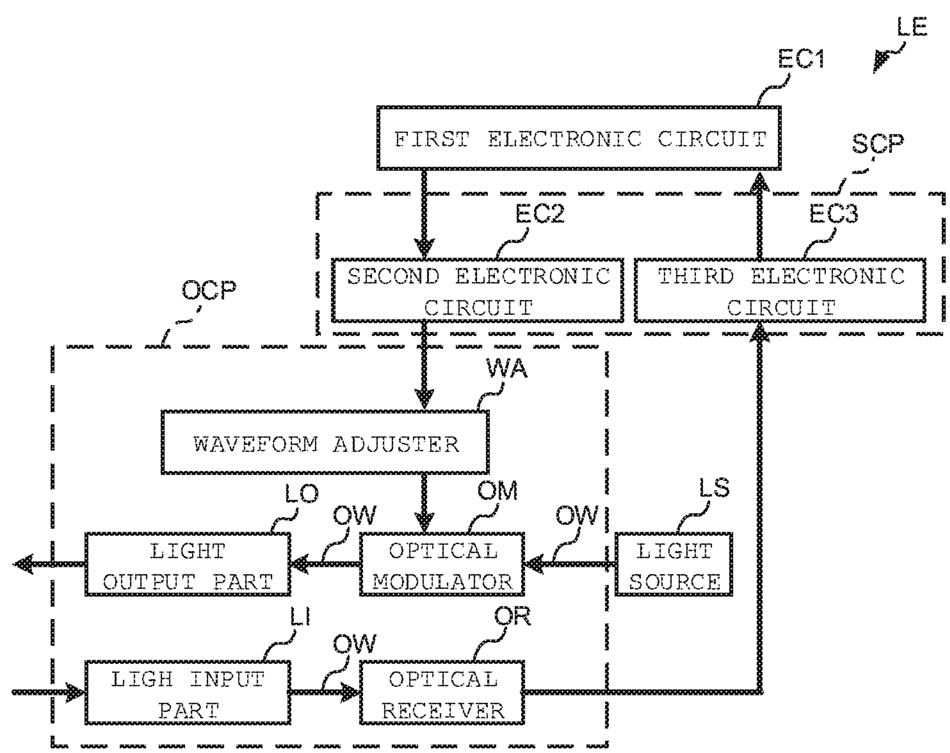
FIG. 1 is a block diagram showing an exemplary configuration of an optoelectronic hybrid device according to an embodiment.

Hereinafter, a semiconductor device according to an embodiment will be described in detail by referring to the drawings. In the specification and the drawings, the same or corresponding components are denoted by the same reference numerals, and a repetitive description thereof is omitted. In the drawings, for convenience of description, the configuration may be omitted or simplified.

[Circuit Configuration of Optoelectronic Hybrid Device]

FIG. 1 is a block diagram showing an exemplary configuration of an optoelectronic hybrid device LE according to the embodiment.

Figure 2:
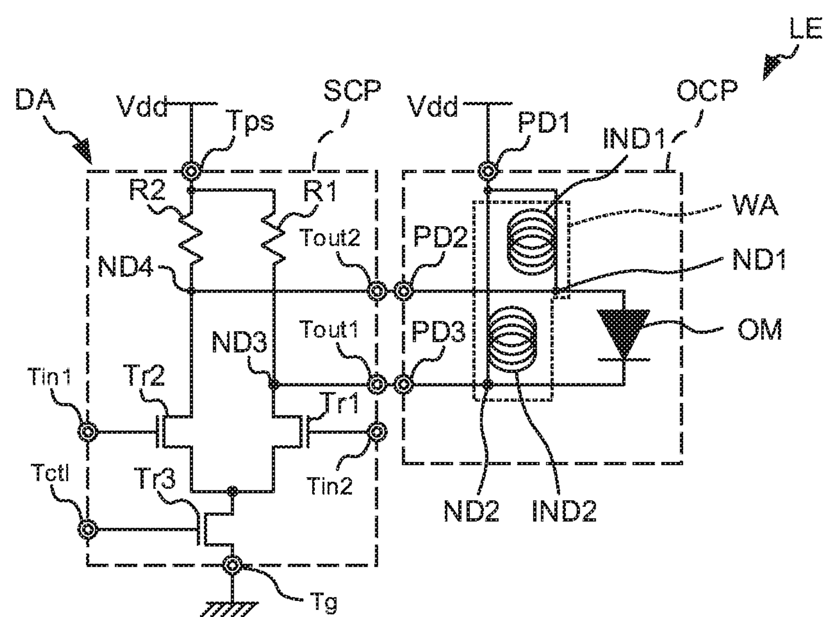
FIG. 2 is a circuit diagram showing an exemplary circuit configuration of a main portion in the optoelectronic hybrid device according to the embodiment.

FIG. 2 is a circuit diagram showing an exemplary circuit configuration of a main portion in the optoelectronic hybrid device LE.

As shown in FIG. 1, the optoelectronic hybrid device LE includes a first electronic circuit EC1, a light source LS, a semiconductor chip SCP, and an optical semiconductor chip OCP. The semiconductor chip SCP includes a second electronic circuit EC2 and a third electronic circuit EC3. The optical semiconductor chip OCP has an optical waveguide OW, a waveform adjuster WA, an optical modulator OM, an light output part LO, a light input part LI, and an optical receiver OR. Details of the configuration of the optical semiconductor chip OCP will be described later.

The First electronic circuit EC1 output an electrical signal (control signal) for control the second electronic circuit EC2. The First electronic circuit EC1 receives electrical signal outputted from the third electronic circuit EC3. The first electronic circuit EC1 is electrically coupled to the second electronic circuit EC2 and the third electronic circuit EC3. The first electronic circuit EC1 is constituted by, for example, a known Central Processing Unit (CPU) or Field-Programmable Gate Array (FPGA) including a control circuit and a storage circuit.

The light source LS emits light. Examples of types of light sources LS include laser diode. A wavelength of the light emitted from the light source LS may be set as appropriate in accordance with material constituting the optical waveguide OW as long as the emitted light can pass through the inside of the optical waveguide OW. For example, a peak wavelength of the light emitted from the light source LS is 1.0 μm or more and 1.6 μm or less. The light source LS is optically connected to the optical modulator OM through the optical waveguide OW.

The second electronic circuit EC2 outputs an electrical signal (control signal) for controlling the operation of the optical modulator OM. More specifically, the second electronic circuit EC2 controls the optical modulator OM based on the control signal received from the first electronic circuit EC1. The second electronic circuit EC2 is electrically coupled to the optical modulator OM. The second electronic circuit EC2 is constituted by, for example, a known transceiver IC including a control circuit. As shown in FIG. 2, the second electronic circuit EC2 according to the present embodiment includes a differential amplifier circuit DA.

The differential amplifier circuit DA amplifies an electrical signal (control signal) for controlling the operation of the optical modulator OM, and outputs the amplified electrical signal (control signal) to the optical modulator OM. The electrical signal input to the differential amplifier circuit DA may be a fixed potential or a variable potential. Details of the circuit configuration of the differential amplifier circuit DA will be described later.

The waveform adjuster WA adjusts the waveform of the electrical signal received from the differential amplifier circuit DA of the second electronic circuit EC2, and outputs the electrical signal to the optical modulator OM. More specifically, the waveform adjuster WA applies so-called peaking to the electrical signal from the differential amplifier circuit DA. In other words, the waveform adjuster WA reduces the transition time (rise time and fall time) of the electrical signal. The transition time is, for example, a time for transitioning from the first state of the signal to the second state of the signal. The first state is, for example, one of an OFF state and an ON state. The second state is, for example, the other of the OFF state and the ON state. The waveform adjuster WA enables the optoelectronic hybrid device LE to handle high-frequency signal. For example, the high-frequency signal is a signal having a frequency of 10 Gbps or more. Details of the configuration of the waveform adjuster WA will be described later.

The optical modulator OM modulates the phase of the light emitted from the light source LS based on the electrical signal received from the second electronic circuit EC2. The optical modulator OM generates an optical signal including information included in the electrical signal. The type of the optical modulator OM is a Mach-Zehnder type optical modulator. The optical modulator OM may be an electrically controlled optical modulator, or a combined optical modulator using a combination of electrical control and thermal control. The optical modulator OM is optically connected to the light output part LO via the optical waveguide OW.

The light output part LO outputs the optical signal modulated by the optical modulator OM to the outside of the optical semiconductor chip OCP. For example, the light output part LO emits an optical signal toward an external optical fiber. Examples of the type of the light output part LO include a grating coupler (GC) and a spot size converter (SSC).

The light input part LI inputs light from the outside to the inside of the optical semiconductor chip OCP. For example, an optical signal emitted from an external optical fiber is input to the inside of the optical semiconductor chip OCP. Examples of the type of light input part LI include a grating coupler (GC) and a spot size converter (SSC). The light input part LI is optically connected with the optical receiver OR via the optical waveguide OW.

The optical receiver OR generates electron-hole pairs based on the optical signal received from the light input part LI. The optical receiver OR converts an optical signal into an electrical signal. The optical receiver OR may have photoelectric conversion characteristics. Examples of the type of the optical receiver OR include an avalanche photodiode type optical receiver. The optical receiver OR is electrically coupled to the third electronic circuit EC3.

The third electronic circuit EC3 processes the electrical signal received from the optical receiver OR and outputs the processed electrical signal to the first electronic circuit EC1. More specifically, the third electronic circuit EC3 amplifies the electrical signal received from the optical receiver OR and outputs the amplified electrical signal to the first electronic circuit EC1. The third electronic circuit EC3 is constituted by, for example, a known receiver IC including an amplifier circuit.

Next, examples of the circuit configuration of a main portion in the optoelectronic hybrid device LE will be described.

FIG. 2 shows a differential amplifier circuit DA among the constituent elements of the semiconductor chip SCP. Among the constituent elements of the optical semiconductor chip OCP, the optical modulator OM and the waveform adjuster WA are shown.

As shown in FIG. 2, the differential amplifier circuit DA has a power supply terminal Tps, a grounding terminal Tg, a first input terminal Tin1, a second input terminal Tin2, a first output terminal Tout1, a second output terminal Tout2, and a control terminal Tct1 as coupling terminals. The differential amplifier circuit DA includes, as circuit elements, a first resistive element R1, a first transistor Tr1, a second resistive element R2, a second transistor Tr2, and a third transistor Tr3.

The power supply terminal Tps is coupled to the power supply Vdd. The ground terminal Tg is coupled to the ground.

The first input terminal Tin1 and the second input terminal Tin2 may be external terminals for inputting signals from circuits outside the semiconductor chip SCP, or may be coupling terminals for inputting signals from other circuits inside the semiconductor chip SCP. The first input terminal Tin1 is coupled with the gate electrode of the first transistor Tr1. The second input terminal Tin2 is coupled with the gate electrode of the second transistor Tr2.

The first output terminal Tout1 and the second output terminal Tout2 are external terminals for outputting signals to circuits outside the semiconductor chip SCP. The first output terminal Tout1 is coupled with the third pad portion PD3 of the optical semiconductor chip OCP. The second output terminal Tout2 is coupled with the second pad portion PD2 of the optical semiconductor chip OCP.

The control terminal Tct1 is coupled with the gate electrode of the third transistor Tr3. The first output terminal Tout1 is coupled with a third node ND3 between the first resistive element R1 and the first transistor Tr1. The second output terminal Tout2 is coupled with a fourth node ND4 between the second resistive element R2 and the second transistor Tr2. Note that "node" is a junction point (intersection point) of two wiring.

The first resistive element R1, the first transistor Tr1, the second resistive element R2, the second transistor Tr2, and the third transistor Tr3 are coupled between the power supply terminal Tps and the grounding terminal Tg. More specifically, the first resistive element R1 and the first transistor Tr1, the second resistive element R2, and the second transistor Tr2 are coupled in parallel with each other between the power supply terminal Tps and the grounding terminal Tg. The third transistor Tr3 is commonly coupled with the first transistor Tr1 and the second transistor Tr2.

The waveform adjuster WA according to the present embodiment includes a first inductor IND1 and a second inductor IND2.

The first inductor IND1 is coupled between the first pad portion PD1 and the second pad portion PD2. More specifically, the first inductor IND1 is coupled to the second pad PD2 via a first node ND1 between the second pad portion PD2 and one end of the optical modulator OM.

The second inductor IND2 is coupled between the first pad portion PD1 and the third pad portion PD3. More specifically, the second inductor IND2 is coupled to the third pad PD3 via the second node ND2 between the third pad portion PD3 and the other end of the optical modulator OM.

[Operation of Optoelectronic Hybrid Device]

Next, an operation example of the optoelectronic hybrid device LE according to the present embodiment will be described.

First, the transmission part of the optoelectronic hybrid device LE will be described. The light emitted from the light source LS reaches the optical modulator OM via the optical waveguide OW. The second electronic circuit EC2 outputs an electrical signal for controlling the operation of the optical modulator OM to the optical modulator OM based on the control signal received from the first electronic circuit EC1. At this time, the differential amplifier circuit DA amplifies a signal input from the first input terminal Tin1 using a differential voltage between the first input terminal Tin1 and the second input terminal Tin2 as an input signal voltage, and outputs the amplified signal to the first output terminal Tout1. The differential amplifier circuit DA amplifies a signal input from the second input terminal Tin2 using the differential voltage as an input signal voltage, and outputs the amplified signal to the second output terminal Tout2.

The electronic signal from the differential amplifier circuit DA reaches the waveform adjuster WA. In the waveform adjuster WA, the electrical signal is given peaking. The optical modulation unit OM modulates the light passing through the optical modulator OM by the electrical signal to which the peaking is applied. As a result, the electrical signal is converted into an optical signal. The optical signal reaches the light output part LO via the optical waveguide OW, and is emitted to the outside of the optical semiconductor chip OCP in the light output part LO. The optical signal emitted from the optical semiconductor chip OCP is guided to another optoelectronic hybrid device via an optical fiber or the like.

Next, the receiving part of the optoelectronic hybrid device LE will be described. An optical signal guided from another optoelectronic hybrid device via optical fibers or the like reach the light input part LI. The optical signal is guided to the inside of the optical waveguide OW in the light input part LI. The optical signal reaches the optical receiver OR via the optical waveguide OW, and is converted into an electrical signal. The electrical signal is processed by the third electronic circuit EC3 and then transmitted to the first electronic circuit EC1.

[Configuration of Optoelectronic Hybrid Device]

Figure 3:
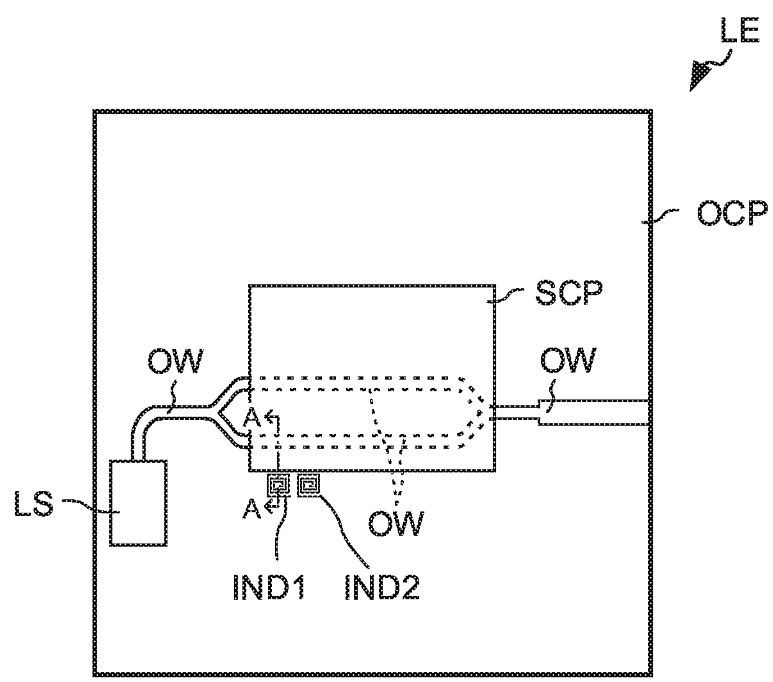
FIG. 3 is a plan view of the optoelectronic hybrid device according to the embodiment.
Figure 4:
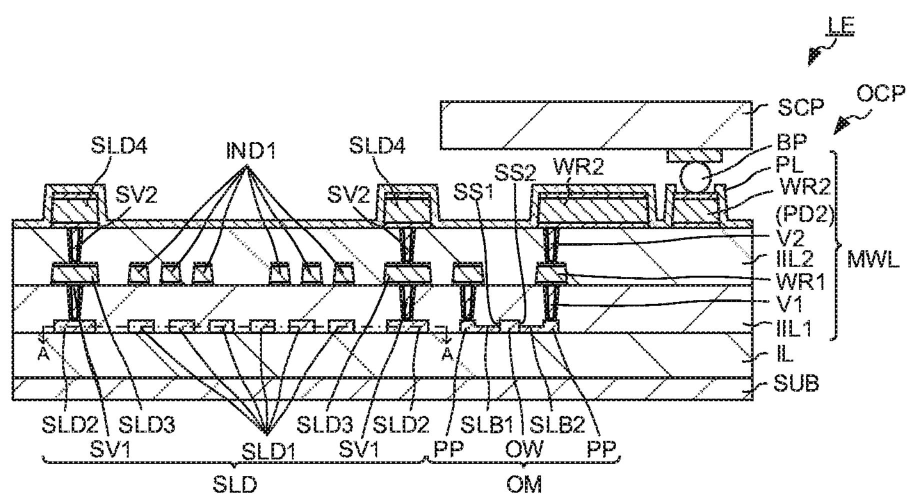
FIG. 4 is a cross-sectional view showing an exemplary configuration of the main portion of the optoelectronic hybrid device according to the embodiment.

Next, the configuration of the optoelectronic hybrid device LE according to the embodiment will be described. FIG. 3 is a plan view of an optoelectronic hybrid device LE. FIG. 4 is a cross-sectional view showing an exemplary configuration of the main portion of the optoelectronic hybrid device LE. FIG. 4 is a partial enlargement cross-sectional view taken along line A-A of FIG. 3.

As shown in FIG. 3, the optoelectronic hybrid device LE includes a light source LS, an optical semiconductor chip (first semiconductor chip) OCP, and a semiconductor chip (second semiconductor chip) SCP.

1. Light Source

The light source LS is disposed on the optical semiconductor chip OCP. The light emitting surface of the light source LS is formed such that the light emitting surface faces an end surface of the optical waveguide OW. The light emitted from the light source LS is guided into the optical waveguide OW. The light source LS is, for example, a laser diode.

2. Optical Semiconductor Chip

As shown in FIGS. 3 and 4, the optical semiconductor chip OCP includes a substrate SUB, an insulating layer IL, an optical modulator OM, a shield SLD, a multilayer wiring layer MWL, a first inductor IND1, and a second inductor IND2. The multilayer wiring layer MWL includes a first interlayer insulating layer IIL1, a first via V1, a first wiring WR1, a second interlayer insulating layer IIL2, a second via V2, a second wiring WR2, a first pad portion PD1, a second pad portion PD2, a third pad portion PD3, and a protective layer PL.

Since the cross-sectional shape of the second inductor IND2 is the same as the cross-sectional shape of the first inductor IND1, the second inductor IND2 is omitted in FIG. 4. Since the cross-sectional shape of the second pad portion PD2 is the same as the cross-sectional shape of the first pad portion PD1 and the cross-sectional shape of the third pad portion PD3, the first pad portion PD1 and the third pad portion PD3 are omitted in FIG. 4.

(Substrate)

The substrate SUB supports the optical modulator OM and a part of the shield SLD via the insulating layer IL. Examples of types of substrate SUB include silicone substrate. The silicon substrate is, for example, a silicon single-crystal substrate containing impurities such as boron (B) and phosphorus (P). For example, the plane orientation of a main surface of the silicon substrate is (100), and the resistivity of the silicon substrate is 5 Ω·cm or more and 50 Ω·cm or less. A thickness of the substrate SUB is, for example, 100 μm or more and 900 μm or less.

(Insulation Layer)

The insulating layer IL is formed on the substrate SUB. The insulating layer IL is a cladding layer for substantially confining the light propagating inside the optical modulator OM (optical waveguide OW) to the inside of the optical modulator OM (optical waveguide OW). Material of the insulating layer IL has a refractive index smaller than that of material of the light modulator OM. Examples of material for the insulating layer IL include silicon oxide (SiO2). The refractive index of the material of the insulating layer IL is, for example, 1.46. In this specification, the refractive index is a numerical value for light having a wavelength of 1.5 μm.

It is preferable that the thickness of the insulating layer IL is greater than the light seepage distance from the light modulator OM. From a viewpoint of reducing stresses caused by the insulating layer IL and from a viewpoint of suppressing sticking of the substrate SUB by electrostatic chucks during manufacturing of the optoelectronic hybrid device LE, the thickness of the insulating layer IL is preferable small. For example, the thickness of the insulating layer IL is preferably 2 μm or more and 3 μm or less.

When the insulating layer IL functions as a support, the optoelectronic hybrid device LE does not need to have the substrate SUB. The insulating layer IL is, for example, sapphire substrate.

(Optical Modulator)

The optical modulator OM according to the present embodiment is a Mach-Zehnder type optical modulator. That is, as shown in FIG. 3, the optical waveguide OW constituting the optical modulator OM includes an input optical waveguide, a pair of optical waveguides branched from the input optical waveguide, and an output optical waveguide. The pair of optical waveguides is positioned between the input optical waveguide and the output optical waveguide.

The optical modulator OM has an optical waveguide OW, a first slab portion SLB1 including a protruding portion PP, and a second slab portion SLB2 including a protruding portion PP. The optical modulator OM is formed on the insulating layer IL. The optical modulator OM is configured to modulate the phase of the light propagating through the inside of the optical waveguide OW.

The optical waveguide OW is a path configured to allow the light to propagate inside the optical waveguide OW. The optical waveguide OW is a part of the optical modulator OM. The optical waveguide OW has a upper surface and a lower surface which are located on opposite sides in the optical waveguide OW, and a first side surface SS1 and a second side surface SS2 located on opposite sides of the optical waveguide OW. The optical waveguide OW is formed on the insulating layer IL. The optical waveguide OW is directly or indirectly covered with the insulating layer IL and the first interlayer insulating layer IIL1. In present embodiment, the first side surface SS1 and the second side surface SS2 of the optical waveguide OW and the upper surface of the optical waveguide OW are in direct contact with the first interlayer insulating layer IIL1. The lower surface of the optical waveguide OW is in direct contact with the insulating layer IL.

As described above, the optical waveguide OW is covered with the insulating layer IL and the first interlayer insulating layer IIL1 having a refractive index smaller than the refractive index of the material of the optical waveguide OW. Thus, the light can travel inside the optical waveguide OW while being substantially confined inside the optical waveguide OW. However, the light travels inside the optical waveguide OW while seeping out to the outside of the optical waveguide OW by the wavelength order of the light.

The cross-sectional shape of the optical waveguide OW in the cross-section orthogonal to the extending direction of the optical waveguide OW may be any shape as long as light can propagate inside the optical waveguide OW. Examples of the cross-sectional shape of the optical waveguide OW include a rectangular shape and a trapezoidal shape. In present embodiment, the cross-sectional shape of the optical waveguide OW is a rectangular shape.

The width and height (thickness) of the optical waveguide OW may be any size as long as the optical waveguide OW can appropriately propagate inside the optical waveguide OW. The width and height of the optical waveguide OW can be appropriately set in accordance with conditions such as the wavelength of light passing through the inside of the optical waveguide OW and the mode of the light. The width of the optical waveguide OW is, for example, 300 nm or more and 500 nm or less. The height of the optical waveguide OW is, for example, 200 nm or more and 300 nm or less.

The width of the optical waveguide OW is a distance between the first side surface SS1 and the second side surface SS2, and is the length of the optical waveguide OW in the opposing direction of the first side surface SS1 and the second side surface SS2, for example, the width direction of the optical waveguide OW. The height of the optical waveguide OW is a distance between the lower surface of the optical waveguide OW and the upper surface of the optical waveguide OW in the opposite directions of the upper surface and the lower surface of the optical waveguide OW. In present embodiment, the height of the optical waveguide OW is a distance between the upper surface of the insulating layer IL and the upper surface of the optical waveguide OW in facing direction of the upper surface and lower surfaces of the optical waveguide OW.

The material of the optical waveguide OW is a semiconductor material transparent to light passing through the inside of the optical waveguide OW. Examples of the material for the optical waveguide OW include silicon and germanium. The crystal structure of the material of optical waveguide OW may be single crystal or polycrystalline. The refractive index of the material of the optical waveguide OW is, for example, 3.5.

The first slab portion SLB1 is formed on the insulating layer ILs such that the first slab portion SLB1 is adjacent to the first side surfaces SS1 of the optical waveguide OW in the widthwise direction of the optical waveguide OW. The first slab portion SLB1 is formed with the optical waveguide OW as a single-piece member. The height (thickness) of the first slab portion SLB1 is preferably smaller than the height (thickness) of the optical waveguide OW from a viewpoint of appropriately confining light inside the optical waveguide OW. The height of the first slab SLB1 is preferably about 100 nm.

The first slab portion SLB1 preferably has protruding portion PPs. Thus, the height of a via on the first slab portion SLB1 can be adjusted. In present embodiment, for example, the height of the first via V1 is approximately the same as the height of the first shield via SV1, which will be described later. The protruding portion PP is formed with the first slab portion SLB1 as a single member. It is preferable that the total thickness of the protruding portion PP is about the same as the height of the optical waveguide OW. The thickness of the protruding portion PP is the distance between the upper surface of the insulating layer IL and the upper surface of the protruding portion PP in the facing direction of the upper surface and the lower surface of the optical waveguide OW.

The first slab portion SLB1 is semiconducting layer having a first conductivity type. The first conductivity type may be an n-type or a p-type. When the first conductivity type is n-type, the first slab portion SLB1 contains n-type impurities such as arsenic (As) and phosphorus (P). When the first conductivity type is p-type, the first slab portion SLB1 contains p-type impurities such as boron (B) and boron difluoride ($BF_2$). For example, the impurities in the first slab part SLB1 is 1×1017 cm−3 or more.

From a viewpoint of suppressing the voltage drop in the first slab portion SLB1 and from a standpoint of forming an ohmic junction between the first via V1 and the first slab portion SLB1, it is preferable that the impurity concentration of a portion of the first slab portion SLB1 that contacts the first via V1 be greater than the impurity concentration of another portion of the first slab portion SLB1. The impurity concentration of the portions of the first slab SLB1 contacted with the first vias V1 (the protruding portion PP) is, for example, 1×1019 cm−3 or more.

The second slab SLB2 is formed on the insulating layer IL such that the second slab SLB2 is adjacent to the second side surfaces SS2 of the optical waveguide OW2 in the width-wise direction of the optical waveguide OW. The second slab SLB2 is formed with the optical waveguide OW as a single member. The height (thickness) of the second slab portion SLB2 is preferably smaller than the height (thickness) of the optical waveguide OW from a viewpoint of appropriately confining light inside the optical waveguide OW. The height of the second slab portion SLB is preferably about 100 nm. It is preferable that the second slab portion SLB2 also has a protruding portion PP similarly to the first slab portion SLB1.

The second slab SLB2 is semiconducting layers having a second conductivity type opposite to the first conductivity type. The second conductivity type may be an n-type or a p-type. For example, the concentration of impurities in the second slab portion SLB2 is 1×1017 cm−3 or more.

(Shielded)

The shield SLD includes a first shield portion SLD1, a second shield portion SLD2, a first shield via SV1, a third shield portion SLD3, a second shield via SV2, and a fourth shield portion SLD4. The shield SLD suppresses the magnetic field generated in the first inductor IND1 from affecting the operation of elements outside the shield SLD, for example, the optical modulator OM. The shield SLD suppresses noises from outside the shield SLD from affecting the characteristics of the first inductor IND1. The configuration of the shield SLD is not particularly limited as long as the function can be obtained.

In the shield SLD, the first shield portion SLD1 and the second shield portion SLD2 are formed on the insulating layer IL and covered with the multilayer wiring layer MWL. Of the shield SLD, the first shield via SV1, the third shield portion SLD3, the second shield via SV2, and the fourth shield portion SLD4 are formed in the multilayer wiring layer MWL.

The first shielding portion SLD1 is formed on the insulating layer. In present embodiment, the number of the first shielding portion SLD1 is plural. The plurality of first shielding portions SLD1 are arranged in parallel with each other along the first direction.

Figure 5:
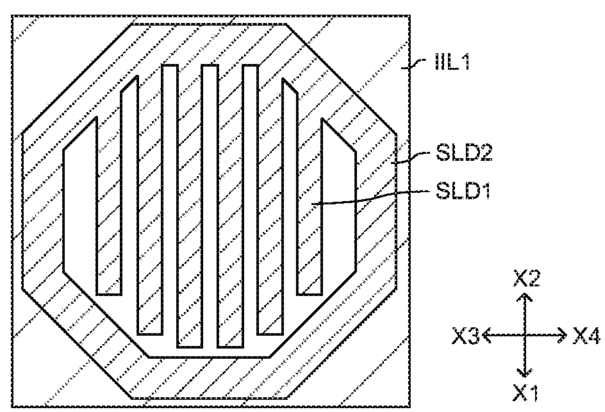
FIG. 5 is a partial enlarged cross-sectional view showing an exemplary configuration of a first shield portion and a second shield portion according to the embodiment.

FIG. 5 is a partially enlarged cross-sectional view showing an exemplary configuration of the first shield portion SLD1 and the second shield portion SLD2 according to the present embodiment. FIG. 5 is a cross-sectional view taken along line A-A of FIG. 4. FIG. 5 shows cross-sectional shapes of the first shield portion SLD1 and the second shield portion SLD2 in cross-sections passing through the first shield portion SLD1 and the second shield portion SLD2 along the upper surface of the insulating layer IL. In FIG. 5, the X1 and X2 directions toward opposite sides and the X3 and X4 directions toward opposite sides are shown. The X1 direction, the X2 direction, the X3 direction, and the X4 direction are orthogonal to each other in plan view.

The position and the shape of the first shield portion SLD1 are not particularly limited as long as the above described shield function can be obtained. It is preferable that the first shield portion SLD1 overlaps with the first inductor IND1 in plan view from a viewpoint of enhancing the shield function. The shape of the first shield portion SLD1 in plan view is a rod shape. An end of the first shield portion SLD1 is not coupled with another conductive member, for example, the second shield portion SLD2. As a result, the generation of eddy currents in the first shield portion SLD1 by the magnetic field generated in the first inductor IND1 is suppressed. As a result, it is possible to suppress the current in the first inductor IND1 from being reduced by the magnetic field caused by the eddy current.

As shown in FIG. 5, the first shield portion SLD1 according to the present embodiment is formed such that the first shield portion SLD1 projects from the second shield portion SLD2 in the X1 direction. In other words, one end (base end) of the first shield portion SLD1 is coupled with the second shield portion SLD2, while the other end (end) of the first shield portion SLD1 is separated from the second shield portion SLD2.

The first shield portion SLD1 has conductivity. The first shield portion SLD1 may be a conductive semiconducting layer or a metallic layer. In present embodiment, the first shield portion SLD1 is, for example, a semiconducting layer with an impure concentration of 1×1019 cm−3 or more. The impurity may be a p-type impurity or an n-type impurity.

The second shield portion SLD2 is formed on the insulating layer. The second shield portion SLD2 is formed in the same layers as the first shield portion SLD1 and the optical modulator OM such that the second shield portion SLD2 surrounds the first inductor IND1 in plan view. The second shield portion SLD2 may or may not be coupled with the first shield portion SLD1. The shape of the second shield portion SLD2 in plan view is not particularly limited, and may be a substantially annular shape or a substantially polygonal shape. The second shield portion SLD2 may have a closed ring structure or an open ring structure.

The second shield portion SLD2 has conductivity. The second shield portion SLD2 may be a conductive semiconducting layer or a metallic layer. In present embodiment, the second shield portion SLD2 is a semiconducting layer with an impurities concentration of 1×1019 cm−3 or more. The impurity may be a p-type impurity or an n-type impurity. The conductivity type of the impurity included in the second shield portion SLD2 may be the same as or different from the conductivity type of the impurity included in the first shield portion SLD1.

The first shield via SV1 is formed in the first interlayer insulating layer IIL1 such that the first shield via SV1 reach the second shield portion SLD2. The first shield via SV1 electrically couples the second shield portion SLD2 and the third shield portion SLD3. The shape of the first shield via SV1 in plan view is not particularly limited, and may be a substantially annular shape or a substantially polygonal shape. The second shield portion SLD2 may have a closed ring structure or an open ring structure. The number of the first shield via SV1 may be one or plural. The plurality of first shield via SV1 may have a columnar shape.

The first shield via SV1 has conductivity. The first shield via SV1 includes, for example, a barrier film and a conductive film formed on the barrier film. Examples of material for the barrier film include titanium (Ti) and titanium nitride (TiN). The material of the conductive film is, for example, tungsten (W).

The third shield portion SLD3 is formed on the first interlayer insulating layer IIL1. The third shield portion SLD3 is formed in the same layer as the first inductor IND1 such that the third shield portion SLD3 surrounds the first inductor IND1 in plan view. The shape of the third shield portion SLD3 in plan view is not particularly limited, and may be a substantially annular shape or a substantially polygonal shape. The third shield portion SLD3 may have a closed ring structure or an open ring structure.

Though not shown, from a viewpoint of drawing the wiring coupled with the first inductor IND1 out of the shield SLD, the third shield portion SLD3 may have an open ring structure.

The third shield portion SLD3 has conductivity. In present embodiment, the third shield portion SLD3 is metallic layer. The third shield portion SLD3 is formed in the same layer as the first wiring WR1 and the first inductor IND1 of the multilayer wiring layer MWL. The third shield portion SLD3 is, for example, a stacked film in which a barrier film, a conductive film, and a barrier film are stacked in this order. Examples of material of the barrier film include titanium (Ti) and titanium nitride (TiN). Examples of material of the conductive film include aluminum, copper, and tungsten.

The second shield via SV2 is formed in the second interlayer insulating layer IIL2 such that second shield via SV2 reaches the third shield portion SLD3. The second shield via SV2 electrically couples the third shield portion SLD3 with the fourth shield portion SLD4. Examples of shape and material of the second shielded via SV2 are the same as those of the first shielded via SV1. The shape and material of the second shielded via SV2 may be the same as or different from the shape and material of the first shielded via SV1.

The fourth shield portion SLD4 is formed on the second interlayer insulating layer IIL2. The fourth shield portion SLD4 is formed such that the fourth shield portion SLD4 surrounds the first inductor IND1 in plan view. The fourth shield portion SLD4 is formed in a layer that differs from the layer of the first inductor IND1. The fourth shield portion SLD4 may be formed in a layer located above the first inductor IND1, or may be formed in a layer located below the first inductor IND1. In present embodiment, the fourth shield portion SLD4 is formed in a layer located above the first inductor IND1. More specifically, the fourth shield portion SLD4 is formed in the same layer as the uppermost layer wiring of the multilayer wiring layer MWL.

The upper surface of the fourth shield portion SLD4 is covered with the protective layer PL. In other words, the upper surface of the fourth shield portion SLD4 is not exposed from the protective layer PL.

Though not shown, from a viewpoint of drawing out the wiring coupled with the first inductor IND1 to the outside of the shield SLD, the fourth shield portion SLD4 may have an open ring structure.

The fourth shielding portion SLD4 has conductivity. In present embodiment, the fourth shield portion SLD4 is a metallic layer. Examples of shape and material of the fourth shield portion SLD4 are the same as those of the third shield portion SLD3. The shape and material of the fourth shield portion SLD4 may be the same as or different from the shape and material of the third shield portion SLD3.

(Multilayer Wiring Layer)

The multilayer wiring layer MWL is formed on the insulating layer IL such that the multilayer wiring layer MWL covers the optical modulator OM, the first shield portion SLD1, and the second shield portion SLD2. The multilayer wiring layer MWL is a layer composed of two or more wiring layers. The wiring layer is a layer having an interlayer insulating layer and one or both of a wiring and a via that are formed in the interlayer insulating layer. The via is a conducting member that electrically couples two wiring formed in layers that differ from each other. In present embodiment, "wiring" is a metallic layer configured to allow an electrical signal to transmit therein.

The multilayer wiring layer MWL includes a first interlayer insulating layer IIL1, a first via V1, a first wiring WR1, a second interlayer insulating layer IIL2, a second via V2, a second wiring WR2, a first pad portion PD1, a second pad portion PD2, a third pad portion PD3, and a protective layer PL. As described above, in FIG. 4, the first pad portion PD1 and the third pad portion PD3 are omitted.

The first interlayer insulating layer IIL1 is formed of material having a refractive index smaller than that of the material of the optical waveguide OW. Examples of material for the first interlayer insulating layer IIL1 include silicon oxide (SiO2). The refractive index of the first interlayer insulating layer IIL1 is, for example, 1.46. The thickness of the first interlayer insulating layer IIL1 is preferably 1.0 μm or more from a viewpoint of suppressing scattering of light seeping out of the optical waveguide OW by the first wiring WR1 formed on the first interlayer insulating layer IIL1. In addition, from a viewpoint of ease of manufacturing processes, the thickness of the first interlayer insulating layer IIL1 is preferably 2 μm or less.

In FIG. 4, two first vias V1 are shown. The two first vias V1 are formed in the first interlayer insulating layer IIL1 such that the two first vias V1 reach the first slab portion SLB1 and the second slab portion SLB2, respectively. The two first vias V1 electrically couple the first slab portion SLB1 with the first wiring WR1 and the second slab portion SLB2 with the first wiring WR1, respectively. As the configuration of the first via V1, a known configuration adopted as a via in the semiconductor technology can be adopted. The first via V1 includes, for example, a barrier film and a conductive film formed on the barrier film. Examples of material for the barrier film include titanium (Ti) and titanium nitride (TiN). The material of the conductive film is, for example, tungsten (W), aluminum (Al), or copper (Cu).

The first wiring WR1 is formed on the first interlayer insulating layer IIL1. The first wiring WR1 is electrically coupled with the optical modulator OM through the first via V1. For the first wiring WR1, a known structure employed as a wiring in the semiconductor technology can be employed. An example of the first wiring WR1 is, for example, a stacked film in which a barrier film, a conductive film, and a barrier film are laminated in this order. Examples of material for the barrier film include titanium (Ti) and titanium nitride (TiN). Example of the material of the conductive film includes Aluminum, copper and tungsten. In present embodiment, the first wiring WR1 is aluminum wiring. The second interlayer insulating layer IIL2 is formed on the first interlayer insulating layer IIL1 such that the second interlayer insulating layer IIL2 covers the first wiring WR1. Examples of material and thicknesses of the second interlayer insulating layer IIL2 are the same as those of the first interlayer insulating layer IIL1.

The second via V2 electrically couples the first wiring WR1 with the second wiring WR2 in the second interlayer insulating layer IIL2. An example of the configuration of the second via V2 is the same as the configuration of the first via V1.

The second wiring WR2 is formed on the second interlayer insulating layer IIL2. In present embodiment, the second wiring WR2 is the top layer wiring of the multilayer wiring layer MWL. Examples of the configuration of the second wiring WR2 are the same as those of the first wiring WR1.

The first pad portion PD1, the second pad portion PD2, and the third pad portion PD3 are portions of the second wiring WR2 that are exposed from the protective layer PL of the multi-layer wiring layer MWL. The first pad portion PD1, the second pad portion PD2, and the third pad portion PD3 are configured to be electrically coupled with external circuits by wire bonding connection or flip-chip connection. In the present embodiment, the second pad portion PD2 is electrically coupled with the semiconductor chip SCP via the bumps BP. From a viewpoint of suppressing damage that may occur to the light modulator OM at the time of bonding, it is preferable that the first pad portion PD1, the second pad portion PD2, and the third pad portion PD3 is located without overlapping with at least one selected from a group consisting of the light modulator OM, the first inductor IND1, and the second inductor IND2 in plan view.

As shown in FIG. 2, the first pad portion PD1 is configured to be electrically coupled with a power supply as a power supply terminal of the optical semiconductor chip OCP. The first pad portion PD1 is electrically coupled with the first inductor IND1.

As shown in FIG. 2, the second pad portion PD2 is configured to be electrically coupled with the second output terminal Tout2 of the differential amplifier circuit DA as an input terminal of the optical semiconductor chip OCP. The second pad portion PD2 is electrically coupled with the first inductor IND1 and the optical modulator OM.

As shown in FIG. 2, the third pad portion PD3 is configured to be electrically coupled with the first output terminal Tout1 of the differential amplifier circuit DA as an input terminal of the optical semiconductor chip OCP. The third pad portion PD3 is electrically coupled with the second inductor IND2 and the optical modulator OM.

The protective layer PL is a layer for protecting the optical semiconductor chip OCP from external moisture and the like. The protective layer PL is formed on the second interlayer insulating layer IIL2. Openings for exposing the first pad portion PD1, the second pad portion PD2, and the third pad portion PD3 are formed in the protective layer PL. On the other hand, the protective layer PL covers the fourth shield portion SLD4. The protective layer PL may be a single layer film or a stacked film of two or more layers. Examples of the protective layer PL include a silicon oxide film, a silicon oxynitride film, a silicon nitride film, a PSG (Phospho Silicate Glass) film, and a stacked film of these films. A thickness of the protective layer PL is, for example, 0.3 μm or more and 0.7 μm or less.

(First Inductor)

The first inductor IND1 is formed in the multilayer wiring layer MWL. In present embodiment, the first inductor IND1 is formed on the first interlayer insulating layer IIL1. The first inductor IND1 is electrically coupled with one end of the optical modulator OM. In other words, the first inductor IND1 is electrically coupled with the first slab portion SLB1 of the optical modulator OM. The first inductor IND1 is electrically coupled between the first pad portion PD1 and the second pad portion PD2.

The size, shape, and number of turn of the first inductor IND1 are not particularly limited as long as desired characteristics can be obtained. For example, the first inductor IND1 is disposed in an area having an area of 80×80 μm2 in plan view. Examples of shapes of the first inductor IND1 include a substantially rectangular shape, a substantially octagonal shape, and a substantially circular shape. The number of turn of the first inductor IND1 is one or more.

(Second Inductor)

The second inductor IND2 is formed in a multilayer wiring layer (not shown). The second inductor IND2 may be formed in the same layer as the first inductor IND1, or may be formed in a layer other than the first inductor IND1. The second inductor IND2 is electrically coupled with the other end of the optical modulator OM. In other words, the second inductor IND2 is electrically coupled with the second slab portion SLB2 of the optical modulator OM.

The size, shape, and number of turn of the second inductor IND2 are not particularly limited as long as desired characteristics can be obtained. Examples of the size, shape, and number of turn of the second inductor IND2 are the same as those of the first inductor IND1.

The first inductor IND1 and the second inductor IND2 are configured to be capable of differential operation. For example, the winding direction of the first inductor IND1 is opposed to the winding direction of the second inductor IND2. When the winding direction of the first inductor IND1 is clockwise, the winding direction of the second inductor IND2 is counterclockwise.

3. Semiconductor Chip SCP

The semiconductor chip SCP is formed on the optical semiconductor chip OCP. In the first embodiment, the semiconductor chip SCP is electrically coupled with the optical semiconductor chip OCP via a bump BP. The semiconductor chip SCP includes differential amplifier circuit DA electrically coupled with the first inductor IND1 and the second inductor IND2. As a configuration of the semiconductor chip SCP, a configuration known as a semiconductor chip having a differential amplifier circuit can be adopted. As shown in FIG. 2, the size of the semiconductor chip SCP is preferably smaller than that of the optical semiconductor chip OCP in plan view.

[Method of Manufacturing Optoelectronic Hybrid Device]

Next, an example of the method of manufacturing the optoelectronic hybrid device LE according to the present embodiment will be described. FIGS. 6 to 15 are a cross-sectional view showing examples of steps included in the method of manufacturing the optoelectronic hybrid device LE.

The method of manufacturing the optoelectronic hybrid device LE according to the present embodiment includes, for example, a step of providing an optical semiconductor chip OCP, a step of preparing a semiconductor chip SCP, and a step of assembling an optical semiconductor chip OCP and a semiconductor chip SCP.

1. Providing of the Optical Semiconductor Chip OCP

The step of providing the optical semiconductor chips OCP includes, for example, (1) a first step of providing the semiconductor wafer SW, (2) a second step of forming the optical modulator OM and a part of the shield SLD, and (3) a third step of forming the multilayer wiring layer MWL, the remainder of the shield SLD, the first inductor IND, and the second inductor IND2.

(1) First Step

Figure 6:
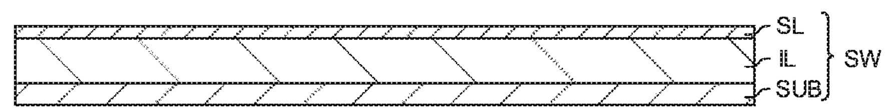
FIG. 6 is a cross-sectional view showing an exemplary step included in a method of manufacturing the optoelectronic hybrid device according to the embodiment.

First, as shown in FIG. 6, a semiconductor wafer SW having a substrate SUB, an insulating layer IL formed on a substrate SUB, and a semiconductor layer SL formed on the insulating layer IL is prepared.

The semiconductor wafer SW may be manufactured or purchased as a commercial product. The semiconductor wafer SW is, for example, a Silicon On Insulator (SOI) substrate. The method of manufacturing SOI substrate can be appropriately selected from a known manufacturing method. Example of manufacturing SOI substrate includes Separation by Implantation of Oxygen (SIMOX) method and smart-cut method. Next, an impurity having a desired impurity concentration is implanted into the semiconductor layer SL by an ion implantation technique.

Examples of substrate SUB and impurity material are described above. Example of material for the semiconductor layer SL includes silicon and germanium. The crystal structure of the material of the semiconductor layer SL may be single crystal or polycrystalline.

(2) Second Step

Figure 7:
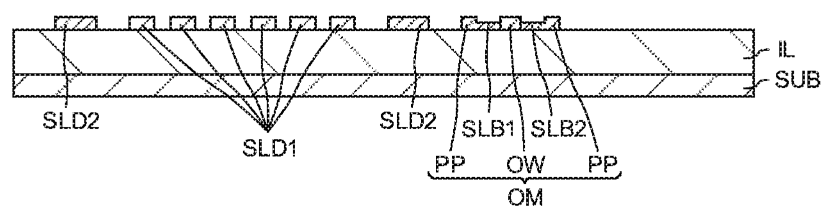
FIG. 7 is a cross-sectional view showing an exemplary step included in the method of manufacturing the optoelectronic hybrid device according to the embodiment.
Figure 8:
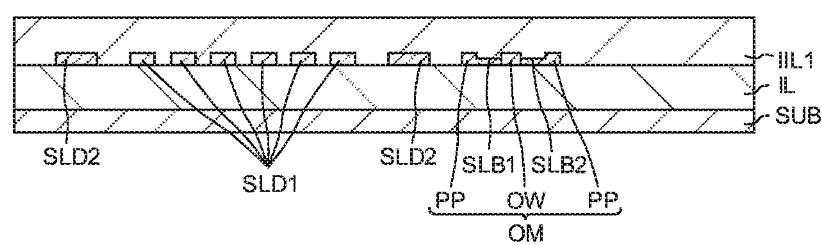
FIG. 8 is a cross-sectional view showing an exemplary step included in the method of manufacturing the optoelectronic hybrid device according to the embodiment.

Next, as shown in FIG. 7, the optical modulator OM, the first shield portion SLD1, and the second shield portion SLD2 are formed by processing the semiconductor layer SL.

The optical modulation OM, the first shield portion SLD1, and the second shield portion SLD2 are formed by, for example, patterning the semiconductor layer SL into a desired shape and then implanting an impurity into a desired region of the semiconductor layer SL. The patterning of the semiconductor layer SL can be performed by photolithography and etching techniques. The impurity implantation method is, for example, an ion implantation method.

(3) Third Step

Next, as shown in FIGS. 8 to 13, the multilayer wiring layer MWL, the remainder of the shield SLD, the first inductor IND1, and the second inductor IND2 are formed.

Figure 9:
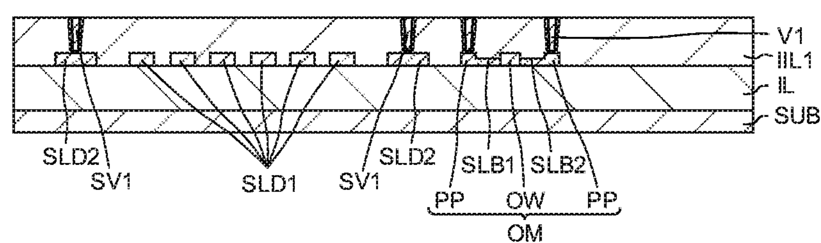
FIG. 9 is a cross-sectional view showing an exemplary step included in the method of manufacturing the optoelectronic hybrid device according to the embodiment.
Figure 10:
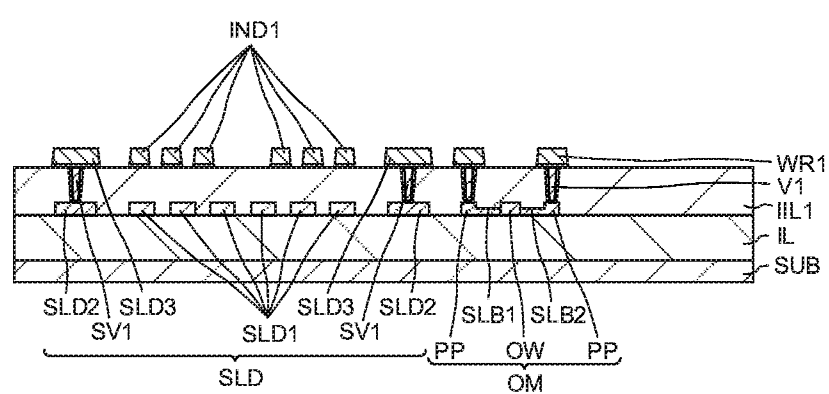
FIG. 10 is a cross-sectional view showing an exemplary step included in the method of manufacturing the optoelectronic hybrid device according to the embodiment.
Figure 11:
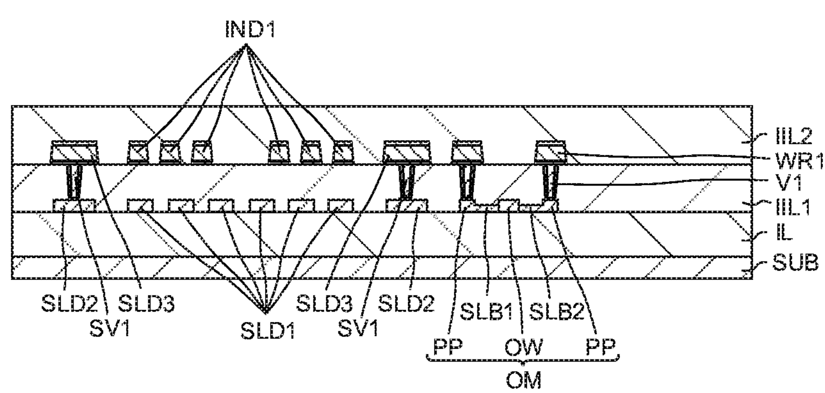
FIG. 11 is a cross-sectional view showing an exemplary step included in the method of manufacturing the optoelectronic hybrid device according to the embodiment.
Figure 12:
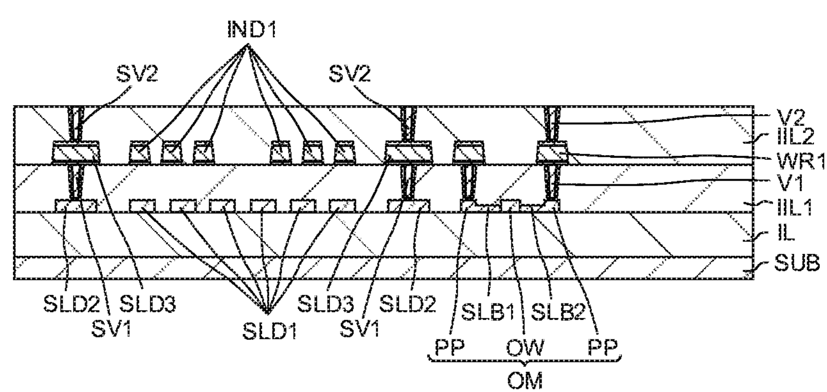
FIG. 12 is a cross-sectional view showing an exemplary step included in the method of manufacturing the optoelectronic hybrid device according to the embodiment.
Figure 13:
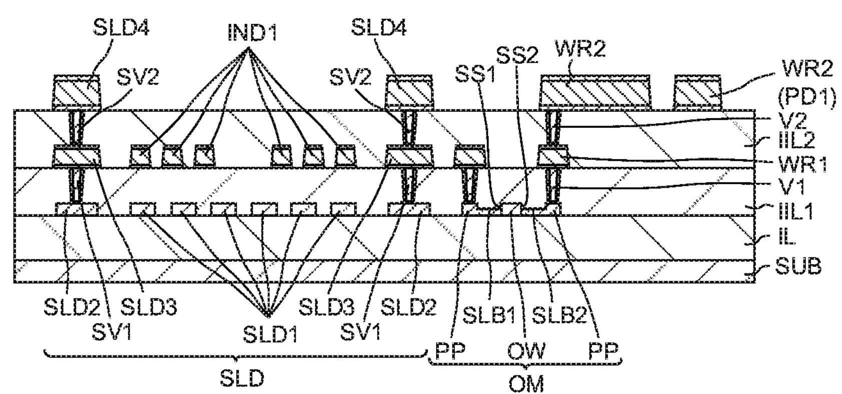
FIG. 13 is a cross-sectional view showing an exemplary step included in the method of manufacturing the optoelectronic hybrid device according to the embodiment.
Figure 14:
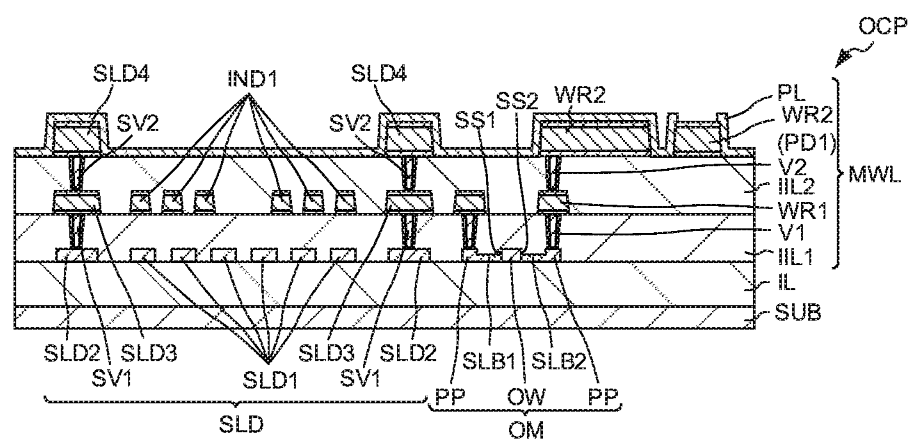
FIG. 14 is a cross-sectional view showing an exemplary step included in the method of manufacturing the optoelectronic hybrid device according to the embodiment.

In the third step, a known method may be employed as a method of forming the multilayer wiring layer in the semiconductor technology. The first interlayer insulating layer IIL1, the second interlayer insulating layer IIL2, and the protective layer PL are formed by, for example, a CVD method (see FIGS. 8, 11, and 14). The first via V1 and the first shield via SV1 are formed, for example, by forming a through hole in the interlayer insulating layer IIL1 and then filling the through hole with conductive material, as shown in FIG. 9. The second via V2 and the second shied via SV2 are formed, for example, by forming a through hole in the interlayer insulating layer IIL2 and then filling the through hole with conductive material, as shown in FIG. 12. The first wiring WR1, the second wiring WR2, the third shield portion SLD3, the fourth shield portion SLD4, the first inductor IND1, and the second inductor IND2 are formed by forming a conductive film by a sputtering method and then patterning the conductive film into a desired shape (see FIGS. 10 and 13).

Finally, by dicing the semiconductor wafer SW, a plurality of singulated optical semiconductor chips OCP are obtained.

2. Providing of Semiconductor Chip SCP

Next, a semiconductor chip SCP is provided. The semiconductor chip SCP may be purchased or manufactured as an off-the-shelf product. The semiconductor chip SCP is, for example, a semiconductor chip SCP having at least a differential amplifier circuit DA.

Figure 15:
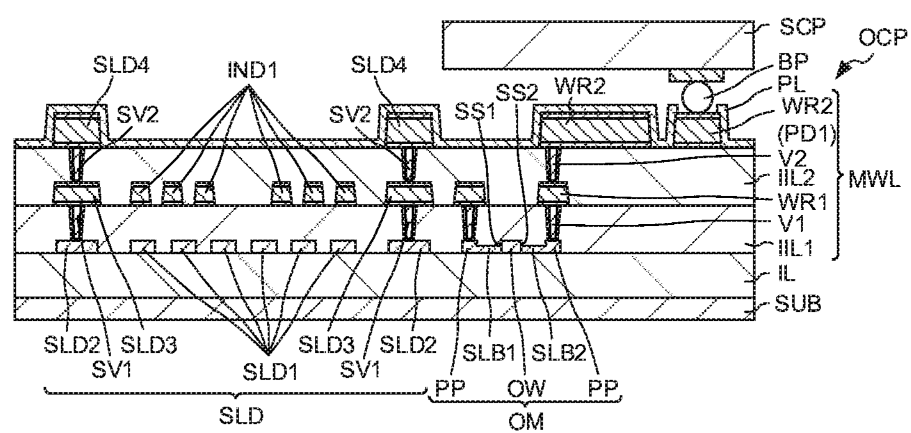
FIG. 15 is a cross-sectional view showing an exemplary step included in the method of manufacturing the optoelectronic hybrid device according to the embodiment.

3. Assembling of the Optical Semiconductor Chip OCP and the Semiconductor Chip SCP Next, as shown in FIG. 15, the optical semiconductor chip OCP and the semiconductor chip SCP are assembled. The pad portion of the optical semiconductor chip OCP and the pad portion of the semiconductor chip SCP are electrically coupled with each other. Examples of connection methods include wire bonding connections and flip chip connections. In present embodiment, the second pad PD2 of the optical semiconductor chip OCP is coupled with the pad of the semiconductor chip SCP via the bump BP by flip-chip connection.

The optoelectronic hybrid device LE according to present embodiment is manufactured by the above manufacturing method. The step of preparing the optical semiconductor chip OCP according to the present embodiment may further include other steps as required. For example, examples of other steps include a step of arranging a laser diode as a light source, a step of forming a grating coupler, a step of forming a spot size converter, and a step of forming a optical receiver. The other steps may be suitably adopted from the formation methods known in the silicon photonics art.

[Effect]

The optical semiconductor chip OCP according to the present embodiment includes the optical modulator OM, the multilayer wiring layer MWL, the first inductor IND1, and the second inductor IND2. From a viewpoint of ensuring desired characteristics, the inductor element is preferably large to somewhat. The optical semiconductor chip OCP according to the present embodiment includes the first inductor IND1 and the second inductor IND2. Therefore, if the optical semiconductor chip OCP according to the present embodiment is used, the inductor elements need not be formed in the semiconductor chip SCP. Therefore, the semiconductor chip SCP can be miniaturized.

First Modified Example

Figure 16:
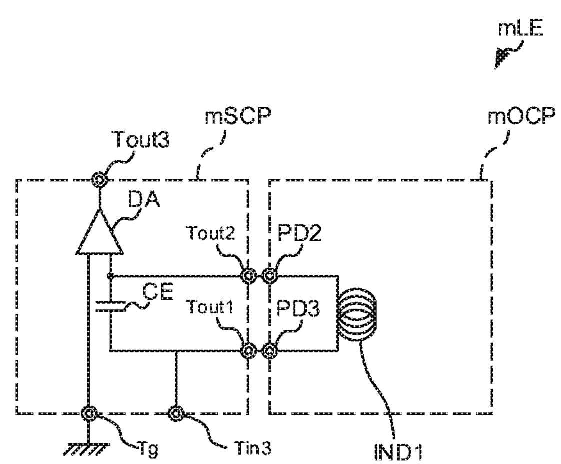
FIG. 16 is a circuit diagram showing an exemplary circuit configuration of a main portion in an optoelectronic hybrid device according to a first modified example of the embodiment.

FIG. 16 is a circuit diagram showing an exemplary circuit configuration of the main portion in the optoelectronic hybrid device mLE according to the first modified example of the present embodiment.

As shown in FIG. 16, the optoelectronic hybrid device mLE according to the first modified example has an optical semiconductor chip mOCP and a semiconductor chip mSCP. The optical semiconductor chip mOCP includes the first inductor IND1 and the optical waveguide (not shown). The semiconductor chip mSCP has, as terminals, the grounding terminal Tg, a third input terminal Tin3, the first output terminal Tout1, the second output terminal Tout2, and a third output terminal Tout3. The semiconductor chip mSCP includes a differential amplifier circuit DA coupled between the grounding terminal Tg and the third output terminal Tout3, and a capacitor CE coupled between the third input terminal Tin3 and the third output terminal Tout3. The first inductor IND1, the differential amplifier circuit DA, and the capacitor element CE constitute a voltage-controlled oscillator (LCVCO).

In the semiconductor chip mSCP according to the first modified example, the first inductor IND1 constitutes a part of a voltage-controlled oscillator (LCVCO). For this reason, the semiconductor chip mSCP according to first modified example does not need to have inductor elements. As a result, in the optoelectronic hybrid device mLE, the semiconductor chip mSCP can be miniaturized by using the optical semiconductor chip mOCP.

Second Modified Example

Figure 17:
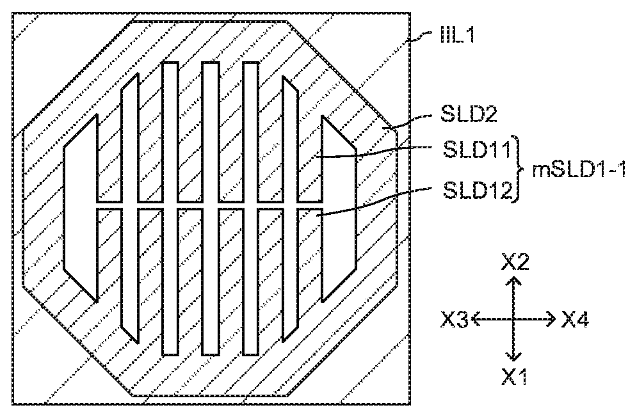
FIG. 17 is a partial enlarged cross-sectional view showing an exemplary configuration of the first shield portion and the second shield portion according to a second modified example of the embodiment.

FIG. 17 is a partial enlarged cross-sectional view showing an exemplary configuration of a first shield portion mSLD1-1 and a second shield portion SLD2 according to the second modified example of the present embodiment.

As shown in FIG. 17, the first shield portion mSLD1-1 has a first shield piece SLD11 protruding from the second shield portion SLD2 in the X1 direction and a second shield piece SLD12 protruding from the second shield portion SLD2 in the X2 direction. In other words, one end (base end) of each of the first shield piece SLD11 and the second shield piece SLD12 is connected with the second shield portion SLD2. The other end of the first shield piece SLD11 faces and is spaced apart from the other end of the second shield piece SLD12. According to the first shield portion mSLD1-1 of the second modified example, the shield function can be further enhanced.

Third Modified Example

Figure 18:
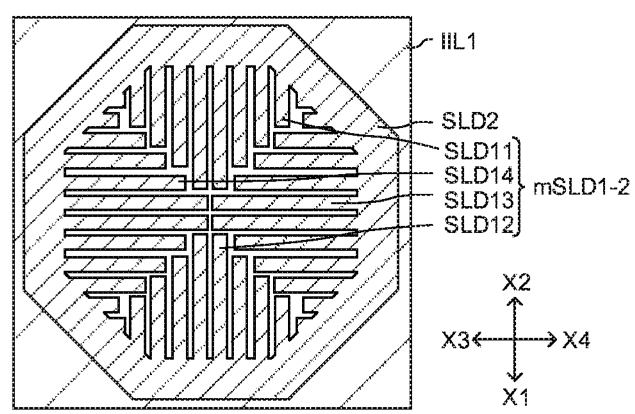
FIG. 18 is a partial enlarged cross-sectional view showing an exemplary configuration of the first shield portion and the second shield portion according to a third modified example of the embodiment.

FIG. 18 is a partial enlarged cross-sectional view showing an exemplary configuration of a first shield portion mSLD1-2 and a second shield portion SLD2 according to the third modified example of the present embodiment.

As shown in FIG. 18, the first shield portion mSLD1-2 has a first shield piece SLD11 protruding from the second shield portion SLD2 in the X1 direction, a second shield piece SLD12 protruding from the second shield portion SLD2 in the X2 direction, a third shield piece SLD13 protruding from the second shield portion SLD2 in the X3 direction, and a fourth shield piece SLD14 protruding from the second shield portion SLD2 in the X4 direction. In other words, one end (base end) of each of the first shield piece SLD11, the second shield piece SLD12, the third shield piece SLD13, and the fourth shield piece SLD14 is connected with the second shield portion SLD2. The other ends of the first shield piece SLD11, the second shield piece SLD12, the third shield piece SLD13, and the fourth shield piece SLD14 are faced with each other and spaced apart from each other. According to the first shield portion mSLD1-2 of the third modified example, the shield function can be further enhanced.

It should be noted that the present invention is not limited to the above embodiments, and various modifications can be made without departing from the gist thereof. For example, the optical semiconductor chip OCP according to the above embodiment includes a first inductor IND1 and a second inductor IND2. However, the optical semiconductor chip OCP may further include a resistive element which is a part of the differential amplifier circuit DA, or may further include a capacitive element CE of the voltage-controlled oscillator circuit LCVCO.

The multilayer wiring layer MWL may further include other layers between the layers. An example of the other layer is, for example, a silicon nitride film. The wiring of the multilayer wiring layer MWL may have a so-called damascene structure. Furthermore, the optical waveguide OW may have a size of the order of μ.

In addition, even when a specific numerical value example is described, it may be a numerical value exceeding the specific numerical value, or may be a numerical value less than the specific numerical value, except when it is theoretically obviously limited to the numerical value. In addition, the component means “B containing A as a main component” or the like, and the mode containing other components is not excluded.

Further, at least a part of the above embodiments and at least a part of the above modified example may be arbitrarily combined with each other. For example, the shape and size of the shield SLD may be appropriately designed.

What is claimed is:

1. A semiconductor device comprising:

a semiconductor substrate;

an insulating layer formed directly on the semiconductor substrate;

an optical waveguide formed on the insulating layer;

an optical modulator formed on the insulating layer, the optical modulator including a portion of the optical waveguide, the optical modulator being configured to modulate a phase of a light propagating through inside of the optical waveguide a wiring layer formed on the insulating layer such that the wiring layer covers both the optical modulator and the optical waveguide, the wiring layer comprising a metallic wiring; and a first inductor formed in the wiring layer, the first inductor being electrically coupled to the optical modulator through the metallic wiring.

2. The semiconductor device according to claim 1, wherein the wiring layer includes 1) a first wiring layer formed on the insulating layer and 2) a second wiring layer formed on the first wiring layer, wherein the optical waveguide and the optical modulator are formed in the first wiring layer, wherein the first inductor is formed in the second wiring layer, wherein the semiconductor device comprises a plurality of first shield portions that is formed on the insulating layer and formed in the first wiring layer, wherein the plurality of first shield portions is arranged in parallel with each other, and wherein the first inductor overlaps the plurality of first shield portions in plan view.

3. The semiconductor device according to claim 2, wherein each of the plurality of the first shield portions is a semiconductor layer, wherein the semiconductor layer has an impurity concentration of $1\times10^{19}$ $cm^{-3}$ or more.

4. The semiconductor device according to claim 2, comprising:

a second shield portion formed in the first wiring layer such that the second shield portion surrounds the first inductor in plan view;

a third shield portion formed in the second wiring layer such that the third shield portion surrounds the first inductor in plan view; and a first shield via formed in the first wiring layer such that the first shield via electrically couples the second shield portion and the third shield portion.

5. The semiconductor device according to claim 4, wherein the second shield portion is a metallic layer formed in the same layer as the optical waveguide, and wherein the third shield portion is a metallic layer formed in the same layer as the second first inductor.

6. The semiconductor device according to claim 4, wherein the semiconductor device comprises:

a fourth shield portion formed on the second wiring layer such that the fourth shield portion surrounds the first inductor in plan view; and a second shield via formed in the second wiring layer such that the second shield via electrically couples the second shield portion and the fourth shield portion.

7. The semiconductor device according to claim 1, comprising a second inductor formed in the wiring layer, wherein the optical waveguide having a first side surface and a second side surface which are located on opposite sides in the optical waveguide wherein the optical modulator further comprises:

a first slab portion being adjacent to the first side surface of the optical waveguide; and a second slab portion being adjacent to the second side surface of the optical waveguide, wherein the first inductor is electrically coupled with the first slab portion via the metallic wiring, and wherein the second inductor is electrically coupled with the second slab portion.

8. The semiconductor device according to claim 1, wherein the wiring layer comprises:

a first pad portion electrically coupled with the first inductor, and a second pad portion electrically coupled with the first inductor, wherein the first inductor is electrically coupled between the first pad portion and the second pad portion.

9. The semiconductor device according to claim 8, wherein the first pad portion is exposed from the wiring layer, and wherein the second pad portion is exposed from the wiring layer.

10. The semiconductor device according to claim 8, wherein the first pad portion and the second pad portion are located without overlapping with at least one selected from a group consisting of the optical modulator and the first inductor.

11. The semiconductor device according to claim 10, wherein the first pad portion and the second pad portion are located without overlapping with the optical modulator and the first inductor.

12. The semiconductor device according to claim 1, comprising:

a first semiconductor chip comprising the optical modulator, the wiring layer, and the first inductor; and a second semiconductor chip comprising an electrical circuit electrically coupled with the first inductor.

13. The semiconductor device according to claim 12, wherein the electrical circuit is a differential amplifier circuit.

14. The semiconductor device according to claim 13, wherein the first semiconductor chip comprises a second inductor formed in the wiring layer, wherein the electrical circuit comprises a first resistive element, a first transistor, a second resistive element, and a second transistor which are electrically coupled between a power supply terminal and a grounding terminal, and wherein the first resistive element and the first transistor are electrically coupled with the second resistive element and the second transistor between the power supply terminal and the grounding terminal.

15. The semiconductor device according to claim 1, wherein the first inductor constitutes a part of a voltage-controlled oscillator.

* * * * *